United States Patent [19]

Hartwig et al.

[11] Patent Number: 4,766,963

[45] Date of Patent: Aug. 30, 1988

[54] HAND-HELD HAMMER TOOL

[75] Inventors: Carl S. M. Hartwig, Täby; Karl G. B. Ragnmark, Kalmar, both of Sweden

[73] Assignee: Institut Cerac S.A., Ecublens, Switzerland

[21] Appl. No.: 39,801

[22] Filed: Apr. 15, 1987

Related U.S. Application Data

[63] Continuation of Ser. No. 754,524, Aug. 13, 1985, abandoned, which is a continuation of Ser. No. 532,193, Sep. 14, 1983, abandoned.

[30] Foreign Application Priority Data

Sep. 22, 1982 [CH] Switzerland ........................ 5599/82

[51] Int. Cl.[4] ............................................ B23B 45/02

[52] U.S. Cl. ............................... 173/109; 173/117

[58] Field of Search ........................ 173/117, 104, 109

[56] References Cited

U.S. PATENT DOCUMENTS 3,056,390 10/1962 Nyholm ............................ 173/109
3,388,273 6/1968 Davis ............................... 310/67 R
3,718,193 2/1973 Wanner ............................. 173/117
3,924,691 12/1976 Brannstrom et al. ............... 173/109
3,929,195 12/1976 Stiltz et al. ......................... 173/109
3,939,921 2/1976 Brannstrom ......................... 173/121
4,423,632 1/1984 Madden et al. ....................... 73/462
4,462,467 7/1984 Weingartner ........................ 173/117
4,489,261 12/1984 Hartwig et al. ..................... 318/700

*Primary Examiner*—E. R. Kazenske
*Assistant Examiner*—James L. Wolfe
*Attorney, Agent, or Firm*—Eric Y. Munson

[57] ABSTRACT

A hand-held electrically powered hammer tool with a rotor-type electromotor (17) and a hammer mechanism (14) arranged in a machine housing (13). The hammer mechanism (14) includes a drive shaft (24) with an excentric crank pin (35) thereon for a piston rod (43) connected to a drive piston (40) reciprocably movable in a cylinder (42) for driving a hammer piston (41) towards a working tool (16) via an air cushion (44) between the two pistons. The drive shaft for the hammer mechanism (14) is also the rotor shaft of the electromotor (17) so that the hammer mechanism and the motor are driven by the same speed. The electromagnetically active parts (23,49) of the rotor (18) are located outside of and surround the corresponding parts (21, 22) of the electromotor stator (19) thus enabling the rotor also to be a flywheel and a fanwheel.

8 Claims, 1 Drawing Sheet

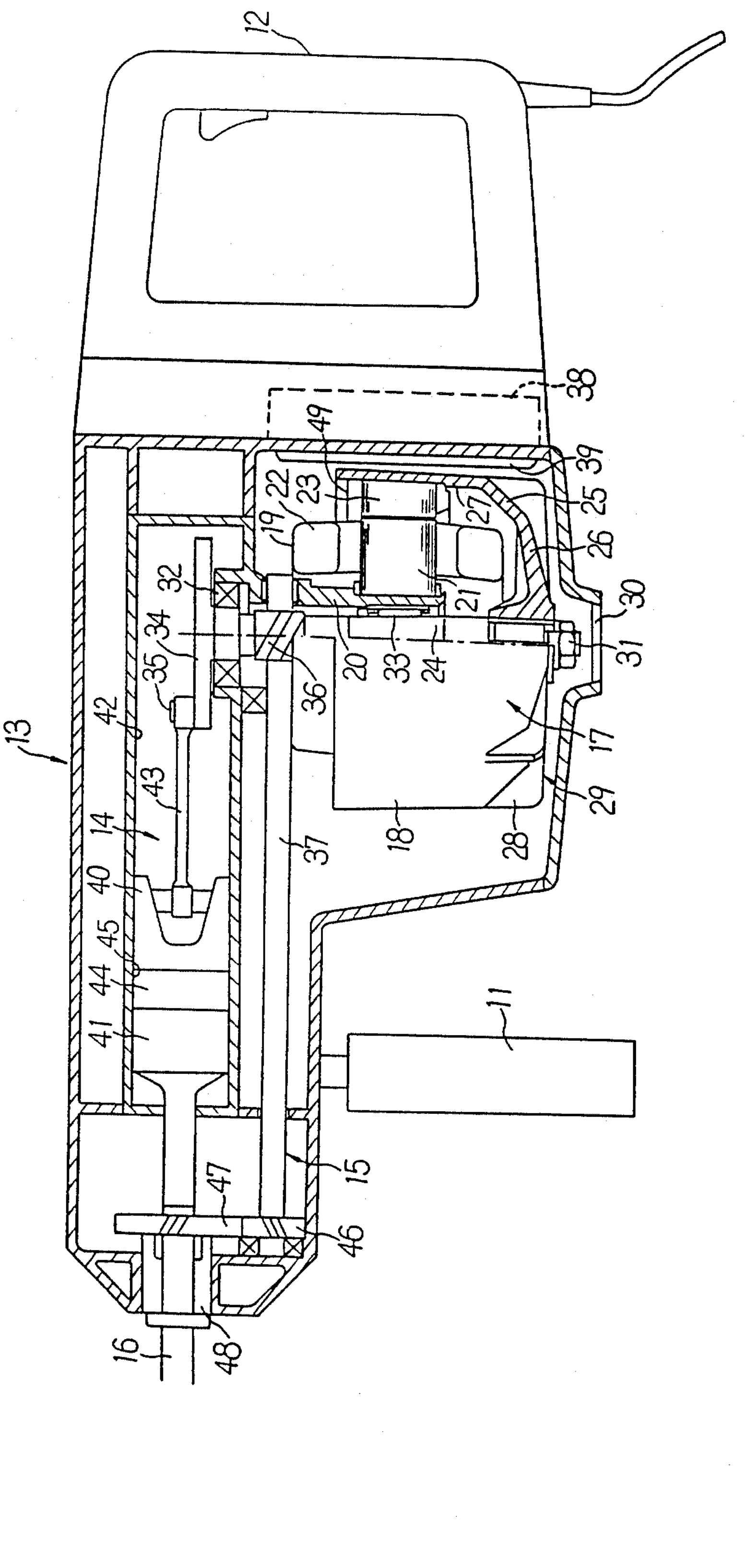
12
38
49
39
22
23
25
27
26
19
30
32
21
31
34
20
33
24
35
36
17
42
13
29
43
28
18
14
37
40
45
44
11
41
15
47
46
16
48

HAND-HELD HAMMER TOOL

This application is a continuation of application Ser. No. 754,524, filed 8/13/85, now abandoned, which is a continuation of Ser. No. 532,193, field 9/14/83, now abandoned.

BACKGROUND OF THE INVENTION

The present invention relates to a hand-held electrically powered hammer tool with a rotor-type electromotor and a hammer mechanism arranged in a machine housing, said hammer mechanism including a drive shaft with an excentric crank pin thereon for a piston rod connected to a drive piston reciprocably movable in a cylinder for driving a hammer piston towards a tool via an elastic means in a working chamber of said cylinder between said pistons.

Hammer tools of this type are known which have a gearing between the electromotor and the hammer mechanism. The gearing has enabled the high-speed series commutator motors previously used to develop a sufficient torque for driving the hammer mechanism without need of being too powerful and heavy which is particularly important for hand-held equipment. The total driving assembly including the gearing will, however, become rather spacious and heavy especially for tools in the high-power range. The gearing is also complicated and expensive to manufacture and often cause working interruptions due to overheating of unsufficiently lubricated gear parts. An additional drawbck with these known hammer tools is that the electromotors have spark producing brushes which may be hazardous in inflammable or explosive atmosphere. The brushes and commutator are also exposed to hard wear since the drill dust reaches these parts.

An object of the present invention is therefore to provide a hammer tool which does not possess the above drawbacks and has a lower weight-to-power ratio than similar machines of prior art and which has a more simple and robust construction.

This object and others are achieved by providing a hammer tool according to the accompanying claims.

BRIEF DESCRIPTION OF THE DRAWING

The invention will now be described more in detail referring to the enclosed drawing, FIG. 1, which is a side view partly in section of a hammer tool according to the invention.

DETAILED DESCRIPTION OF THE INVENTION

The tool shown in FIG. 1 is designed to be hand-held by means of a front 11 and a rear 12 handle mounted on a machine housing 13. The housing 13 contains a hammer mechanism 14 and a rotary mechanism 15 for transmitting percussive and rotary action to a working tool 16 at the front end thereof. Said two mechanisms are driven by a common electromotor 17 which is a 8-polar AC asynchronous motor without brushes. The motor 17 includes a rotor 18 and a stator 19 which are carried on a tubular structure 20. The electromagnetically active parts of the stator are a iron core 21 and a winding 22 while the corresponding parts of the rotor are an iron core 23 and a squirrel cage 49. The rotor comprises a rotor shaft 24 which constitutes the drive shaft for the hammer mechanism 14 which thus is driven with the same number of revolutions as the rotor itself. The rotor also comprises a bowl-shaped body 25 with a bottom 26 and a cylindrical wall 27 on the inside of which the electromagnetically active iron core 23 is attached. The outside of the bottom 26 is shaped with radially extending fan blades 28 together forming a centrifugal fan 29 with an inlet 30. The fan 29 is adapted for cooling both the motor 17 and the hammer mechanism 14. The bowl-shaped body 25 and the rotor shaft 24 are connected to each other by a screw joint 31 in the center of the bottom 26. The rotor shaft 24 is carried on the structure 20 by a front bearing 32 and a rear bearing 33 and is integrally shaped with a disc shaped crank 34 which has an excentric crank pin 35 for transferring the driving movement to the hammer mechanism 14. The rotor shaft 24 also comprises a worm screw 36 for transmitting rotory movement to the rotary mechanism 15 by a worm wheel, not shown, on a drive shaft 37 included in said mechanism 15. As an alternative to this worm gearing a conic gearing can be used including a bevel gear wheel mounted on each of the shafts 24 and 37.

The 8-polar asynchronous motor 17 is connected to an external electric power source, normally the mains supply, via an electronic converter 38 located between the rear handle 12 and the machine housing 13. The electronic components of the converter are attached to the wall of the machine housing which comprises cooling flanges 39 in that area.

The fan 29 blows an air stream along the wall with the flanges 39 thus also cooling said electronic components. The converter 38 which for example is of the kind described in CH patent application 8097/81 is arranged for transferring low frequency 50–60 Hz voltage of the mains supply to motor voltage of high frequency about 200 Hz and for controlling the generated power of the motor 17.

The hammer mechanism 14 is of a kind previously known for example by the U.S. Pat. No. 3,939,921 and will therefore be described only briefly. The mechanism thus includes in addition to said crank 34 a drive piston 40 and a hammer piston 41 arranged in a cylinder 42. The drive piston 40 is reciprocably movable in the cylinder 42 by means of a connecting rod 43 connected to the crank pin 35. The drive piston 40 drives the hammer piston 41 against the working tool 16 or the tool holder via a compressed air cushion 44 in a working chamber 45 between said pistons 40 and 41. When the hammer tool is used for drilling holes the necessary removal of drill cutting is achieved by conducting flushing air to a flushing channel in the drill for example in the same way as described in the U.S. patent mentioned above.

The rotary mechanism 15 comprises said worm gear 36, said drive shaft 37 and a gear wheel 46 mounted on the shaft 37, which wheel 46 cooperates with cogs 47 on a drill sleeve 48. A sliding clutch, not shown, is incorporated in the sleeve 48 for disengaging the drill rotation for example if the drill tool 16 is stuck in the drill hole. The sliding clutch can also be arranged in connection with the worm gear 36 for example in the way disclosed in the U.S. Pat. No. 3,924,691.

The hammer mechanism 14 as described above is directly coupled to the rotor shaft 24 which means that the motor speed must be adapted to the desired speed of the hammer mechanism 14 which is about 3000–4000 revolutions per minute for these kinds of tools. It might therefore seem natural to use a 2-polar asynchronous motor which would adopt such a speed when fed from the mains with a standard frequency of 50–60 Hz. A motor of that kind must, however, be chosen spacious and heavy to achieve the necessary driving force of the hammer mechanism. By chosing a multi-polar, instead preferably 8-polar, asynchronous motor, which, by means of the converter, can be given a sufficient speed, the motor size can be limited with retained sufficient drive force. The converter also makes it possible to continously adapt the speed to existing different external drilling conditions of the hammer mechanism for example when collaring a hole or when drilling in alternating hard and soft material. Further the motor can be started and accelerated to full speed without any risk of overheating because of the fact that the frequency and the motor voltage can be adapted to the instantaneous load conditions experienced by the motor.

Since the motor is a so called external pole motor with the rotor located outside the stator, the rotor can produce a sufficient flywheel moment to counterbalance the load variation under each revolution depending on the compression and expansion of the air cushion. This will exclude the need for a separate balance wheel and will in addition give a compact motor design with a short length and a possibility to integrate the fan in the rotor.

The hammer tool according to the described example is primarily adapted for percussive drilling but there is also possibility to separately drive the hammer or rotary mechanism. The hammer mechanism can for example be disconnected by ventilating the working chamber 45 by the same way as been described in said U.S. Pat. No. 3,939,921 while the rotary mechanism can be disconnected as apparent from said U.S. Pat. No. 3,924,691 or by suitable device for declutching the gear wheels 46 and 47 from each other.

The invention is of course not limited to the described example but can be varied in many ways within the scope of the accompanying claims.

We claim:

1. A hand-held hammer drill comprising: a housing (13); a drill (16) projecting into said housing (13); a single rotor-type electromotor (17) in said housing (13) incorporating a stator (19) and a rotor (18); a reciprocating hammer mechanism (14) and a rotary mechanism (15) in said housing (13) driven by a common rotor shaft (24) of said rotor (18), said hammer mechanism (14) including a connecting rod (43) connected to a drive piston (40) reciprocably movable in a cylinder (42) for driving a hammer piston (41) towards and away from said drill (16) via an air cushion (44) in a working chamber (45) located between said pistons (40,41) in said cylinder (42), said rotor (18) continuously driving crank means (34) mounted eccentrically on said rotor shaft (24) to rotate therewith and connected to said connecting rod (43) to move said drive piston (40) in a reciprocating manner within said cylinder (42) without any intermediate gear means, said rotary mechanism (15) including drill engaging means (46,47) for imparting a rotary motion to said drill (16) during the reciprocating movement of said drive piston (40); a drive shaft (37) in said rotary mechanism (15) drivingly connected to said drill engaging means (46,47) at one end thereof, the other end thereof being connected to a driving gear (36) on said rotor shaft (24) for transmitting a rotary movement to said drive shaft (37) a bowl-shaped inertial body (25) surrounding said electromotor (17), fixedly from the bottom of which said rotor shaft (24) extends centrally into and through said bowl-shaped body (25), said bowl-shaped body (25) while continuously rotating, being adapted to counterbalance by its flywheel momentun the load variations of said hammer mechanism (14) acting on said rotor shaft (24), the interior wall (27) of said bowl-shaped body (25) supporting the electromagnetically active parts (23,49) of said rotor (18) so as to rotatably surround the electromagnetically active parts (21,22) of said stator (19); and a tubular structure (20) of said housing (13) extending centrally into the bowl of said bowl-shaped body (25) for fixedly supporting on said structure (20), said active stator parts (21,22) and rotatably supporting said rotor shaft (24) in said structure (20).

2. A hammer drill according to claim 1, in which said tubular housing structure (20) supports axially spaced bearings (32,33) for said rotor shaft (24), said bearings providing the sole rotary support for said bowl-shaped body (25) in said housing (13).

3. A hammer drill according to claim 1, in which said electromotor (17) is an 8-polar asynchronous motor.

4. A hand-held hammer tool comprising; a housing (13), a hammer mechanism (14) and a single rotor-type electromotor (17) in said housing (13) for driving said hammer mechanism therein; a working tool (16) projecting into said housing (13), said hammer mechanism (14) including a connecting rod (43) connected to a drive piston (40) reciprocably movable in a cylinder (42) in said housing (13) for driving a hammer piston (41) towards and away from an impact position on said working tool (16) via an air cushion (44) in a working chamber (45) located between said pistons (40,41) in said cylinder (42), said electromotor (17), comprising a stator (19, a rotor (18) and a rotor shaft (24) for continuously driving crank means (35) mounted on said rotor shaft (24) to rotate in unison therewith and connected to said connecting rod (43) to move said drive piston (40) in a reciprocating manner within said cylinder (42) without any intermediate gear means, said rotor (18) comprising a bowl-shaped inertial body (25) surrounding said electromotor (17), fixedly from the bottom of which said rotor shaft (24) extends centrally into and through said bowl-shaped body (25), said bowl-shaped body (25) while continuously rotating being adapted to counterbalance by its flywheel momentum the load variations of said hammer mechanism (14) acting on said rotor shaft (24), the interior wall (27) of said body (25) supporting the electromagnetically active parts (23,49) of said rotor (18) so as to rotatably surround the electromagnetically active parts (21,22) of said stator (19); and a tubular structure (20) forming part of said housing (13), said structure (20) extending centrally into the bowl of said bowl-shaped body (25) so as to support fixedly on said structure (20) said electromagnetically active stator parts (21,22) and within said structure (20) to support rotatably said rotor shaft (24) carrying said bowl-shaped body (25).

5. A hammer tool according to claim 4, in which said tubular housing structure (20) supports axially spaced bearings (32,33) for said rotor shaft (24), said bearings providing the sole rotary support for said bowl-shaped body (25) in said housing (13).

6. A hammer tool according to claim 5, in which the outside bottom (26) of said bowl-shaped body (25) is provided with peripherally distributed fan blades (28), said housing (13) having outer wall portion adjacent to but spaced from said bottom (26), and an air inlet (30) provided in said outer wall portion in alignment with said rotor shaft (24), through which said inlet (30) ambient cooling air is aspirated by said fan blades (28) during rotation of said bowl-shaped body (25) to cool the interior of said housing (13).

7. A hammer tool according to claim 4, in which said electromotor (17) is a brushless multipolar AC-motor arranged to be fed with high frequency current.

8. A hammer tool according to claim 4, in which said elecromotor (17) is an 8-polar asynchronous motor.

* * * * *